US008624829B2

(12) United States Patent
Lin et al.

(10) Patent No.: US 8,624,829 B2
(45) Date of Patent: Jan. 7, 2014

(54) LIGHT-EMITTING DIODE (LED) DRIVING CIRCUIT

(71) Applicant: Top Victory Investments Ltd., Kowloon (HK)

(72) Inventors: Li-Wei Lin, New Taipei (TW); Chen-Chiang Lee, New Taipei (TW); Chi-Hsin Lee, New Taipei (TW); Wen-Ming Lin, New Taipei (TW); Chun-Chi Liao, New Taipei (TW); Yuan-Po Huang, New Taipei (TW)

(73) Assignee: Top Victory Investments Ltd., Kowloon (HK)

( * ) Notice: Subject to any disclaimer, the term of this patent is extended or adjusted under 35 U.S.C. 154(b) by 0 days.

(21) Appl. No.: 13/913,789

(22) Filed: Jun. 10, 2013

(65) Prior Publication Data

US 2013/0271008 A1 Oct. 17, 2013

Related U.S. Application Data

(62) Division of application No. 12/913,837, filed on Oct. 28, 2010, now Pat. No. 8,525,774.

(30) Foreign Application Priority Data

Oct. 28, 2009 (TW) ............................... 98136410 A
Nov. 11, 2009 (TW) ............................... 98138314 A

(51) Int. Cl.
*G09G 3/36* (2006.01)
*G06F 3/038* (2013.01)
*G09G 3/10* (2006.01)

(52) U.S. Cl.
USPC ......................... 345/102; 345/211; 315/169.3

(58) Field of Classification Search
USPC ............... 345/204–215, 87–104, 690, 39, 46; 315/160–176; 362/97.1–97.2
See application file for complete search history.

(56) References Cited

U.S. PATENT DOCUMENTS 6,864,641 B2 3/2005 Dygert .......................... 315/216
6,982,527 B2 1/2006 Lee et al. ...................... 315/224
7,514,989 B1 4/2009 Somerville et al. ........... 327/543
7,675,240 B2 3/2010 Yang et al. .................... 315/192
7,683,553 B2 3/2010 Fong ......................... 315/185 R
7,728,529 B2 6/2010 Liu et al. ....................... 315/291
7,768,212 B2 8/2010 Chen et al. .................... 315/225
(Continued)

FOREIGN PATENT DOCUMENTS

TW M366686 U 10/2009

*Primary Examiner* — Amr Awad
*Assistant Examiner* — Roberto Flores
(74) *Attorney, Agent, or Firm* — Alan Kamrath; Kamrath IP Lawfirm, P.A.

(57) ABSTRACT

A light-emitting diode (LED) driving circuit for driving a plurality of first lightbars and a plurality of second lightbars is provided. The LED driving circuit includes a first current mirror, a second current mirror and a control circuit. The first current mirror, if enabled, balances currents of the first lightbars. The second current mirror, if enabled, balances currents of the second lightbars. During a first period, the control circuit disables the second current mirror and adjusts the duration of enabling the first current mirror according to a dimming signal. During a second period, the control circuit disables the first current mirror and adjusts the duration of enabling the second current mirror according to the dimming signal. Therefore, only the first lightbars or the second lightbars are driven in each period.

4 Claims, 5 Drawing Sheets

(56) References Cited

U.S. PATENT DOCUMENTS

| | | | | |
|---|---|---|---|---|
| 7,884,557 | B2 | 2/2011 | Steele et al. | 315/306 |
| 7,888,884 | B2 * | 2/2011 | Ye et al. | 315/291 |
| 8,344,656 | B2 | 1/2013 | Du et al. | 315/297 |
| 8,390,262 | B2 | 3/2013 | Chang et al. | 323/282 |
| 8,410,711 | B2 | 4/2013 | Lin et al. | 315/224 |
| 2003/0025120 | A1 | 2/2003 | Chang | 257/92 |
| 2005/0093473 | A1 | 5/2005 | Yeh et al. | 315/185 R |
| 2006/0049782 | A1 | 3/2006 | Vornsand et al. | 315/312 |
| 2007/0114951 | A1 | 5/2007 | Tsen et al. | 315/291 |
| 2007/0222391 | A1 | 9/2007 | Lee et al. | 315/82 |
| 2008/0061716 | A1 * | 3/2008 | Kim et al. | 315/307 |
| 2008/0111800 | A1 | 5/2008 | Wang et al. | 345/204 |
| 2008/0136769 | A1 * | 6/2008 | Kim et al. | 345/102 |
| 2008/0198299 | A1 | 8/2008 | Choi et al. | 349/68 |
| 2009/0073096 | A1 * | 3/2009 | Mittal et al. | 345/82 |
| 2009/0085489 | A1 | 4/2009 | Chang et al. | 315/193 |
| 2009/0109168 | A1 | 4/2009 | Lee et al. | 345/102 |
| 2009/0153066 | A1 | 6/2009 | Yang et al. | 315/192 |
| 2009/0190065 | A1 * | 7/2009 | Konno et al. | 349/61 |
| 2009/0225021 | A1 | 9/2009 | Ye et al. | 345/102 |
| 2009/0261743 | A1 | 10/2009 | Chen et al. | 315/192 |
| 2009/0295776 | A1 | 12/2009 | Yu et al. | 345/212 |
| 2009/0322235 | A1 | 12/2009 | Shiu et al. | 315/185 R |
| 2009/0322252 | A1 | 12/2009 | Shiu et al. | 315/297 |
| 2010/0001663 | A1 * | 1/2010 | Wu et al. | 315/308 |
| 2010/0072898 | A1 | 3/2010 | Ohashi et al. | 315/127 |
| 2010/0109537 | A1 | 5/2010 | Nishino et al. | 315/185 R |
| 2010/0141163 | A1 | 6/2010 | Ye et al. | 315/189 |
| 2010/0148679 | A1 | 6/2010 | Chen et al. | 315/185 R |
| 2010/0225622 | A1 | 9/2010 | Wang et al. | 345/204 |
| 2010/0301762 | A1 | 12/2010 | Kung et al. | 315/193 |
| 2012/0306387 | A1 | 12/2012 | Ferguson | 315/185 R |

* cited by examiner

LIGHT-EMITTING DIODE (LED) DRIVING CIRCUIT

CROSS-REFERENCE TO RELATED APPLICATIONS

The present application is a division of U.S. application Ser. No. 12/913,837 filed Oct. 28, 2010, which claims the priority benefit of Taiwan application serial no. 98136410, filed Oct. 28, 2009, and Taiwan application serial no. 98138314, filed Nov. 11, 2009, the contents of which are hereby incorporated by reference herein in their entireties.

BACKGROUND OF THE INVENTION

1. Field of the Invention

The present invention relates to a light-emitting diode (LED) driving circuit. More particularly, the present invention relates to an LED driving circuit for driving a plurality of lightbars each including a plurality of LEDs coupled in series.

2. Description of the Prior Art

FIG. 1 is a block diagram illustrating a conventional LED driving circuit. Referring to FIG. 1, an LED driving circuit 1 is adapted to driving a plurality of lightbars LB1-LBm, and each lightbar LBi includes a plurality of LEDs D1-Dn coupled in series, where m and n are positive integers, and i is an integer from 1 to m. The LED driving circuit 1 includes a direct-current to direct-current (DC/DC) converter 11 and an LED controller 12. The DC/DC converter 11 such as a buck or boost converter converts a DC input voltage Vin to a DC voltage Vlb sufficient to drive the lightbars LB1-LBm. Each lightbar LBi has a first terminal coupled to the DC/DC converter 11 to receive the DC voltage Vlb and a second terminal coupled to a corresponding channel terminal CHi of the LED controller 12. The LED controller 12 detects current of each lightbar LBi and controls current of each lightbar LBi to become equal to a predetermined value by built-in constant current sources or variable resistors; that is, the LED controller 12 balances currents of the lightbars LB1-LBm. The LED controller 12 further outputs a feedback signal from a feedback terminal FB to control the DC/DC converter 11 to adjust the DC voltage Vlb.

If too many lightbars LB1-LBm are employed, or if LEDs D1-Dn with high brightness are employed, the total current of the lightbars LB1-LBm may cause the LED controller 12 to be destroyed. Accordingly, there is a need for an LED driving circuit to employ external control manner shown in FIG. 2. Referring to FIG. 2, an LED driving circuit 2 includes a DC/DC converter 21, an LED controller 22, a plurality of transistors M1-Mm and a plurality of resistors R1-Rm. The transistor Mi and the resistor Ri are coupled in series between the second terminal of a corresponding lightbar LBi and a ground. The LED controller 22 detects current of each lightbar LBi from a corresponding current sensing terminal ISi and outputs a signal from a corresponding channel terminal CHi to control current of each lightbar LBi to become equal to a predetermined value. The LED controller 22 further detects a voltage at the second terminal of each lightbar LBi from a voltage detecting terminal VDi to provide a short protection for the LED driving circuit 2.

The LED driving circuits 1 and 2 employ the LED controllers 12 and 22 which are specific-purpose integrated circuits (ICs). However, a commercially available LED controller IC supports a fixed number of lightbars. It may be necessary to employ a plurality of LED controller ICs to drive the lightbars as the number of the lightbars increases. The number of the transistors M1-Mm and the resistors R1-Rm employed in the LED driving circuit 2 will increase as the number of the lightbars increases. Therefore, as the number of the lightbars increases, the conventional LED driving circuits become more complex and expensive to design and manufacture.

SUMMARY OF THE INVENTION

It is therefore an object of the present invention to provide an LED driving circuit employing a simple driving structure with reduced components and without using a specific-purpose LED controller IC.

The present invention provides an LED driving circuit for driving a plurality of first lightbars and a plurality of second lightbars. Each of the first lightbars and the second lightbars includes a plurality of LEDs coupled in series. Each of the first lightbars and the second lightbars has a first terminal coupled to receive a direct-current (DC) voltage and a second terminal. The LED driving circuit includes a first current mirror, a second current mirror and a control circuit. The first current mirror is coupled to the second terminals of the first lightbars. The first current mirror balances currents of the first lightbars when the first current mirror is enabled, and causes the currents of the first lightbars to become zero when the first current mirror is disabled. The second current mirror is coupled to the second terminals of the second lightbars. The second current mirror balances currents of the second lightbars when the second current mirror is enabled, and causes the currents of the second lightbars to become zero when the second current mirror is disabled. The control circuit is coupled to the first current mirror and the second current mirror. During a first period, the control circuit disables the second current mirror and adjusts the duration of enabling the first current mirror according to a dimming signal. During a second period, the control circuit disables the first current mirror and adjusts the duration of enabling the second current mirror according to the dimming signal. The first period and the second period are repeated alternatively.

The first current mirror includes a first constant current source, a plurality of first transistors and a second transistor. The first constant current source provides a first constant current. Each of the first transistors and the second transistor has a first terminal, a second terminal and a control terminal. The first terminal of each first transistor is coupled to the second terminal of a corresponding first lightbar. The second terminals of the first transistors and the second transistor are coupled to one another and to a ground. The control terminals of the first transistors and the second transistor are coupled to one another and to the first terminal of the second transistor, the first constant current source and the control circuit. The first transistors and the second transistor are matched to one another. The second current mirror includes a second constant current source, a plurality of third transistors and a fourth transistor. The second constant current source provides a second constant current having the same magnitude as the first constant current. Each of the third transistors and the fourth transistor has a first terminal, a second terminal and a control terminal. The first terminal of each third transistor is coupled to the second terminal of a corresponding second lightbar. The second terminals of the third transistors and the fourth transistor are coupled to one another and to the ground. The control terminals of the third transistors and the fourth transistor are coupled to one another and to the first terminal of the fourth transistor, the second constant current source and the control circuit. The third transistors and the fourth transistor are matched to one another.

The control circuit includes a controller, a first switch unit, a second switch unit, a short protection circuit, a third switch unit and a fourth switch unit. The controller outputs a first pulse-width modulation (PWM) signal and a second PWM signal. Duty cycles of the first PWM signal and the second PWM signal are determined by the dimming signal. The first switch unit has a first terminal coupled to the control terminal of the second transistor, a second terminal coupled to the ground and a control terminal. The second switch unit has a first terminal coupled to the control terminal of the fourth transistor, a second terminal coupled to the ground and a control terminal. The short protection circuit is coupled to the second terminals of the first lightbars and the second lightbars and outputs a short signal. The short signal is valid when a voltage at the second terminal of one of the first lightbars and the second lightbars is larger than a threshold voltage. The short signal is invalid when voltages at the second terminals of the first lightbars and the second lightbars are smaller than the threshold voltage. The third switch unit has a first terminal coupled to receive the first PWM signal, a second terminal coupled to the control terminal of the first switch unit and a control terminal coupled to receive the short signal. The third switch unit is open when the short signal is valid, and the third switch unit is closed when the short signal is invalid. The first switch unit is open or closed according to the first PWM signal when the third switch unit is closed, and the first switch unit is closed when the third switch unit is open. The fourth switch unit has a first terminal coupled to receive the second PWM signal, a second terminal coupled to the control terminal of the second switch unit and a control terminal coupled to receive the short signal. The fourth switch unit is open when the short signal is valid, and the fourth switch unit is closed when the short signal is invalid. The second switch unit is open or closed according to the second PWM signal when the fourth switch unit is closed, and the second switch unit is closed when the fourth switch unit is open.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
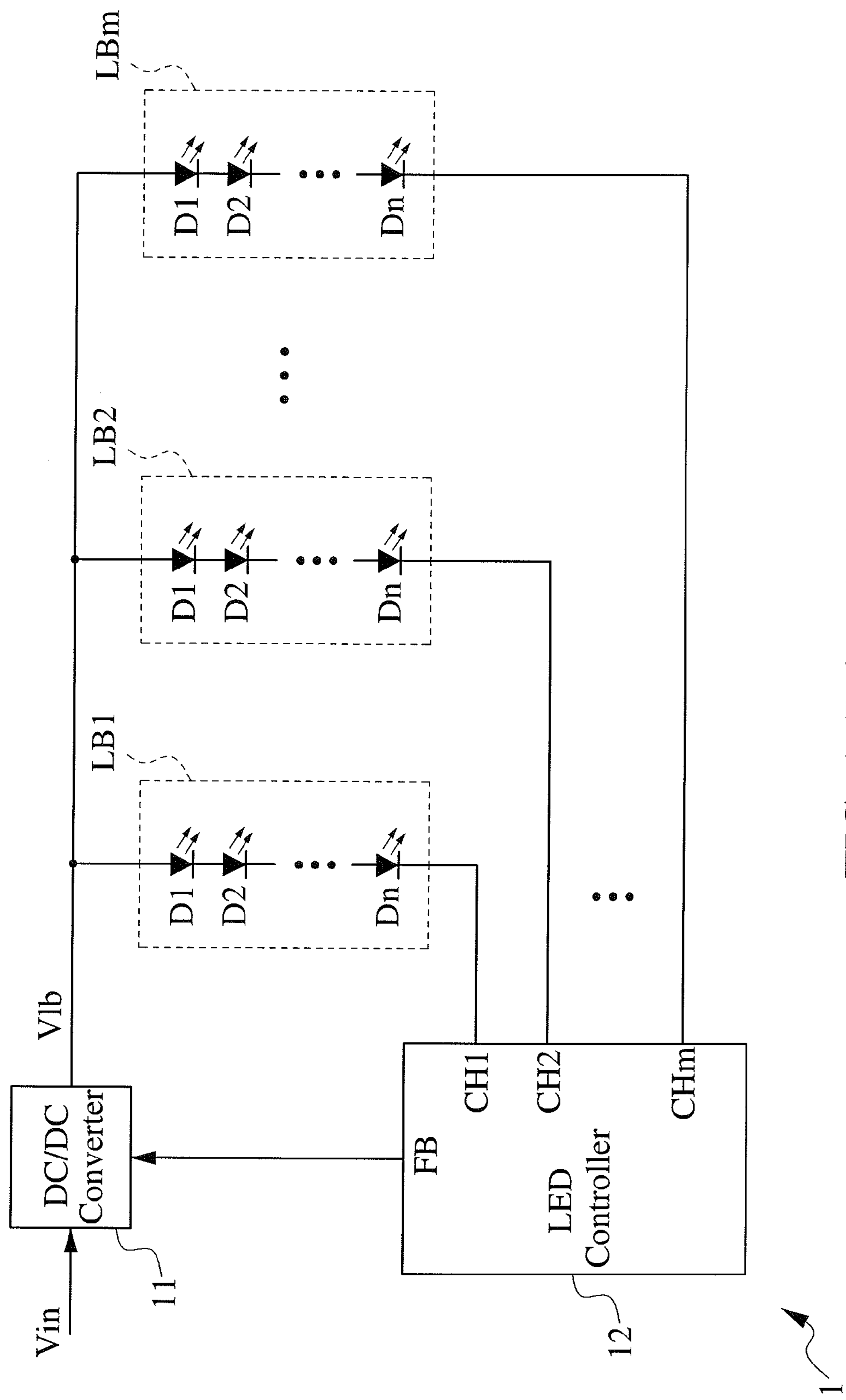
FIG. 1 is a block diagram illustrating a conventional LED driving circuit.
Figure 2:
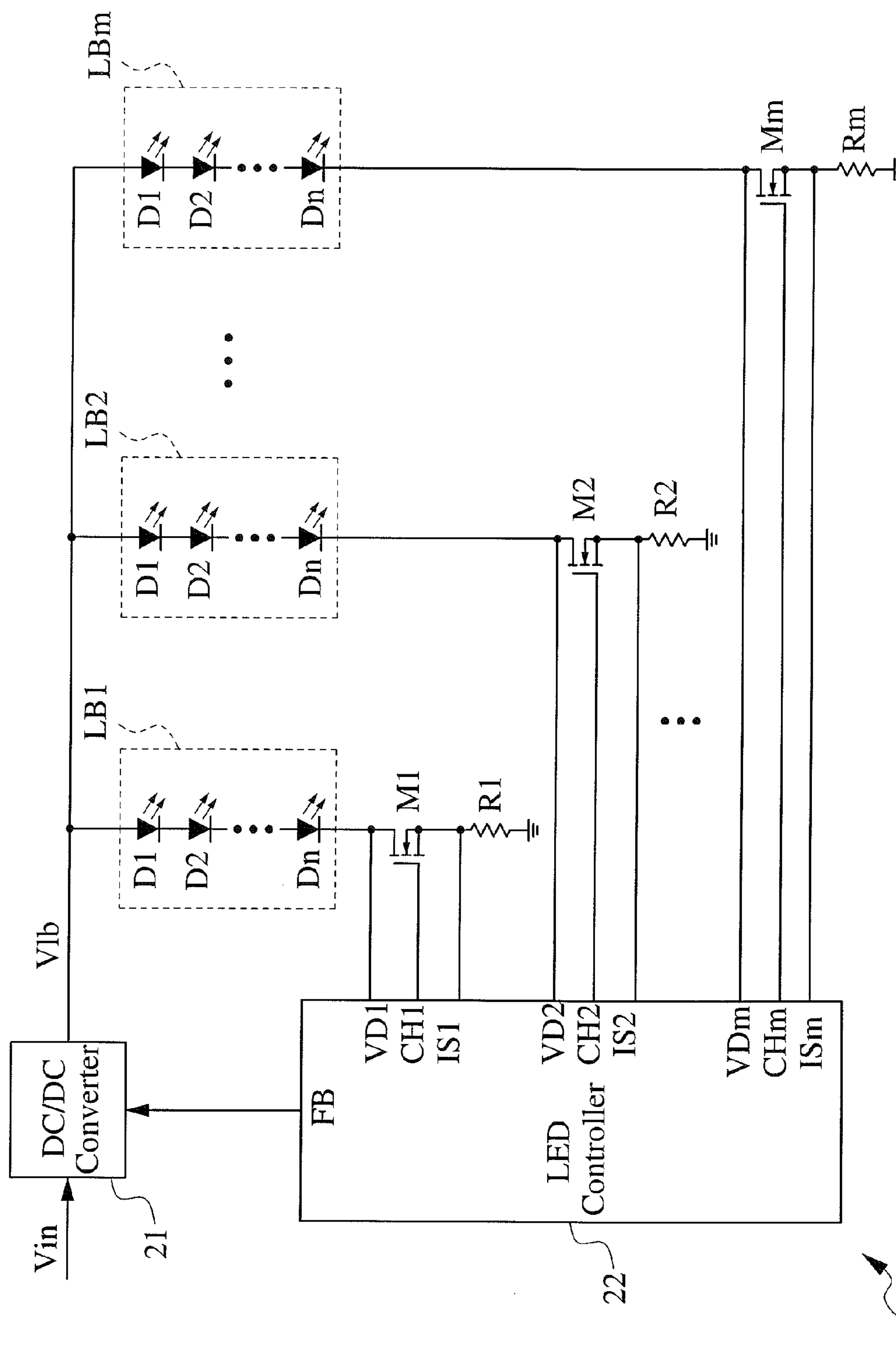
FIG. 2 is a block diagram illustrating another conventional LED driving circuit.

Reference will now be made in detail to the preferred embodiments of the present invention, examples of which are illustrated in the accompanying drawings. Wherever possible, the same reference numbers are used in the drawings and the description to refer to the same or like parts.

Figure 3:
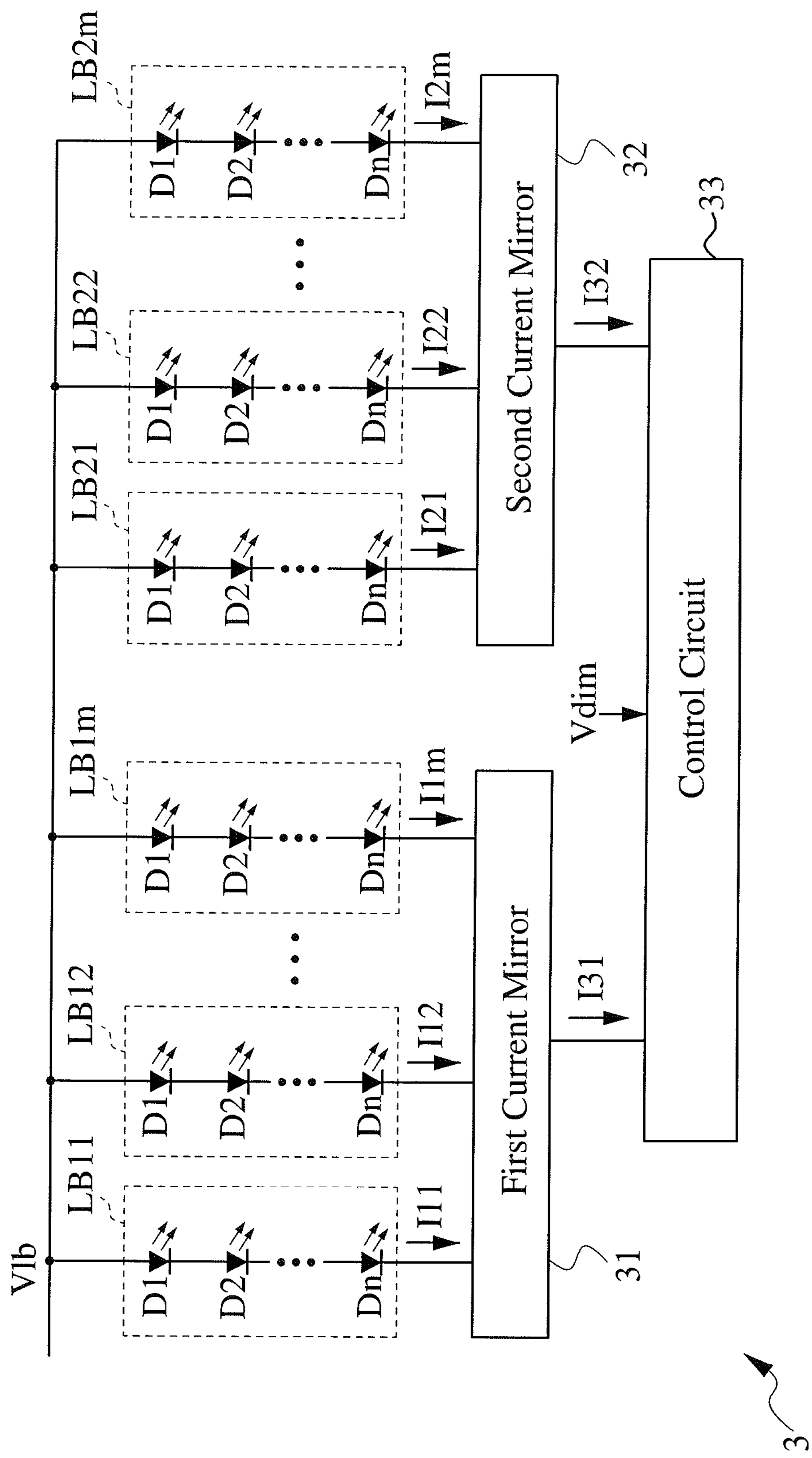
FIG. 3 is a block diagram illustrating an LED driving circuit according to a preferred embodiment of the present invention.

FIG. 3 is a block diagram illustrating an LED driving circuit according to a preferred embodiment of the present invention. Referring to FIG. 3, an LED driving circuit 3 is adapted to driving a plurality of first lightbars LB11-LB1*m* and a plurality of second lightbars LB21-LB2*m*, where m is a positive integer. Each of the first lightbars LB11-LB1*m* and the second lightbars LB21-LB2*m* includes a plurality of LEDs D1-Dn coupled in series, where n is a positive integer. Each of the first lightbars LB11-LB1*m* and the second lightbars LB21-LB2*m* has a first terminal coupled to receive a DC voltage Vlb and a second terminal. The DC voltage Vlb, for example, is provided by the DC/DC converter 11 shown in FIG. 1.

The LED driving circuit 3 includes a first current mirror 31, a second current mirror 32 and a control circuit 33. The first current mirror 31 is coupled to the second terminals of the first lightbars LB11-LB1*m* to receive currents I11-I1*m* of the first lightbars LB11-LB1*m*. The first current mirror 31 balances the currents I11-I1*m* of the first lightbars LB11-LB1*m* when the first current mirror 31 is enabled, and causes the currents I11-I1*m* of the first lightbars LB11-LB1*m* to become zero when the first current mirror 31 is disabled. The second current mirror 32 is coupled to the second terminals of the second lightbars LB21-LB2*m* to receive currents I21-I2*m* of the second lightbars LB21-LB2*m*. The second current mirror 32 balances the currents I21-I2*m* of the second lightbars LB21-LB2*m* when the second current mirror 32 is enabled, and causes the currents I21-I2*m* of the second lightbars LB21-LB2*m* to become zero when the second current mirror 32 is disabled. The control circuit 33 is coupled to the first current mirror 31 and the second current mirror 32. During a first period, the control circuit 33 disables the second current mirror 32, and the control circuit 33 enables the first current mirror 31 and adjusts the duration of enabling the first current mirror 31 according to a dimming signal Vdim. During a second period, the control circuit 33 disables the first current mirror 31, and the control circuit 33 enables the second current mirror 32 and adjusts the duration of enabling the second current mirror 32 according to the dimming signal Vdim. The first period and the second period are repeated alternatively.

Figure 4:
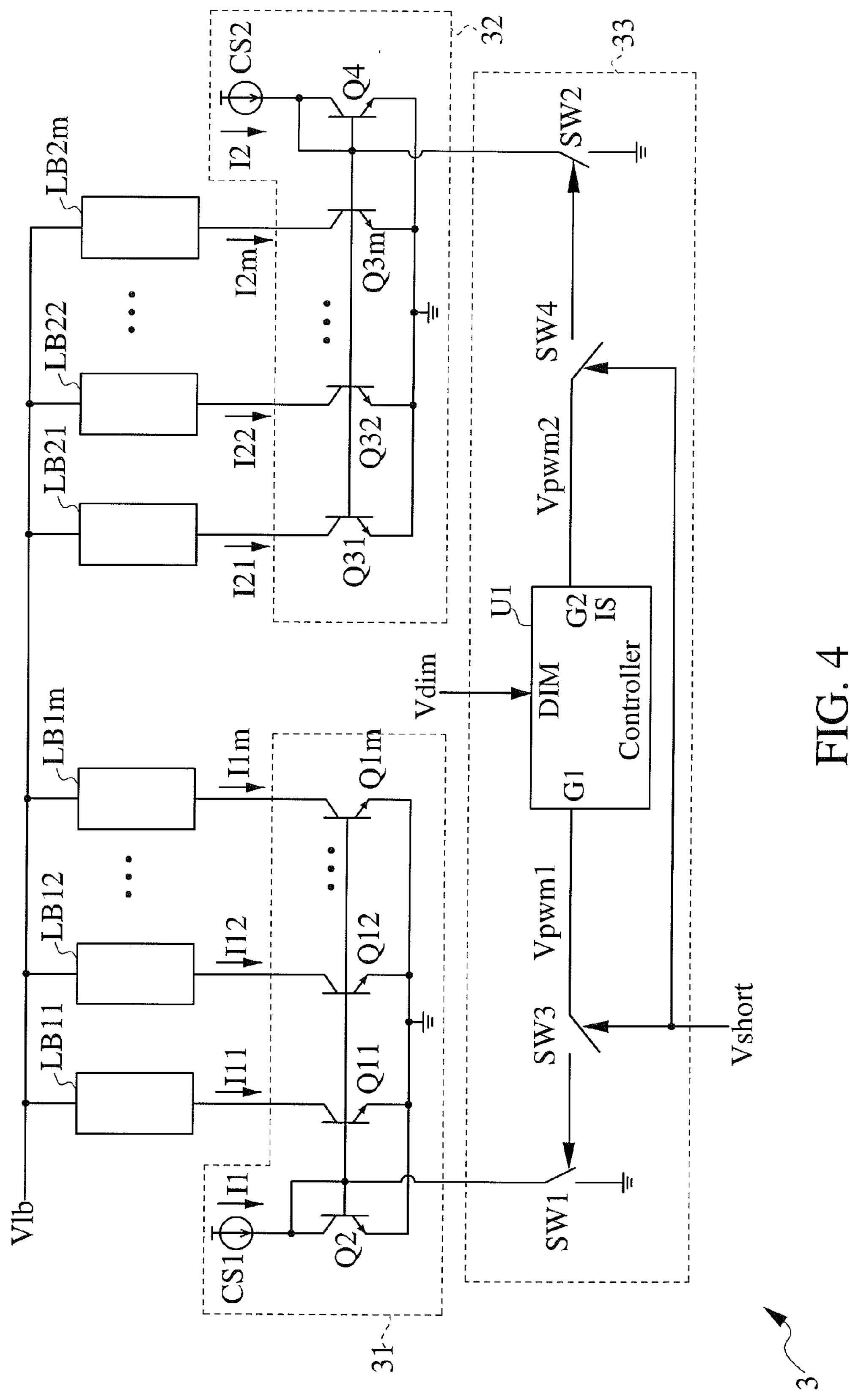
FIG. 4 is a schematic diagram illustrating the LED driving circuit shown in FIG. 3.

FIG. 4 is a schematic diagram illustrating the LED driving circuit shown in FIG. 3. Referring to FIG. 4, the first current mirror 31 includes a first constant current source CS1, a plurality of first transistors Q11-Q1*m* and a second transistor Q2. The first constant current source CS1 provides a first constant current I1. Each of the first transistors Q11-Q1*m* and the second transistor Q2 has a first terminal, a second terminal and a control terminal, in which each of the first transistors Q11-Q1*m* is hereinafter called each first transistor Q1*i*, where i is an integer from 1 to m. The first terminal of each first transistor Q1*i* is coupled to the second terminal of a corresponding first lightbar LB1*i*. The second terminals of the first transistors Q11-Q1*m* and the second transistor Q2 are coupled to one another and to a ground. The control terminals of the first transistors Q11-Q1*m* and the second transistor Q2 are coupled to one another and to the first terminal of the second transistor Q2, the first constant current source CS1 and the control circuit 33. The first transistors Q11-Q1*m* and the second transistor Q2 are matched to one another.

The second current mirror 32 includes a second constant current source CS2, a plurality of third transistors Q31-Q3*m* and a fourth transistor Q4. The second constant current source CS2 provides a second constant current I2 having the same magnitude as the first constant current I1. Each of the third transistors Q31-Q3*m* and the fourth transistor Q4 has a first terminal, a second terminal and a control terminal, in which each of the third transistors Q31-Q3*m* is hereinafter called each third transistor Q3*i*, where i is an integer from 1 to m. The first terminal of each third transistor Q3*i* is coupled to the second terminal of a corresponding second lightbar LB2*i*.

The second terminals of the third transistors Q31-Q3*m* and the fourth transistor Q4 are coupled to one another and to the ground. The control terminals of the third transistors Q31-Q3*m* and the fourth transistor Q4 are coupled to one another and to the first terminal of the fourth transistor Q4, the second constant current source CS2 and the control circuit 33. The third transistors Q31-Q3*m* and the fourth transistor Q4 are matched to one another.

In this embodiment, the first transistors Q11-Q1*m*, the second transistor Q2, the third transistors Q31-Q3*m* and the fourth transistor Q4 are NPN bipolar junction transistors (BJTs). In an alternative embodiment, the first transistors Q11-Q1*m*, the second transistor Q2, the third transistors Q31-Q3*m* and the fourth transistor Q4 are N-channel field-effect transistors (FETs).

The control circuit 33 includes a controller U1, a first switch unit SW1, a second switch unit SW2, a short protection circuit (not shown), a third switch unit SW3 and a fourth switch unit SW4. The controller U1 outputs a first PWM signal Vpwm1 and a second PWM signal Vpwm2. Duty cycles of the first PWM signal Vpwm1 and the second PWM signal Vpwm2 are determined by the dimming signal Vdim. The first switch unit SW1 has a first terminal coupled to the control terminal of the second transistor Q2, a second terminal coupled to the ground and a control terminal. The second switch unit SW2 has a first terminal coupled to the control terminal of the fourth transistor Q4, a second terminal coupled to the ground and a control terminal. In this embodiment, the controller U1 is a general-purpose PWM controller IC such as TL494 or OZ9938. The controller U1 has a dimming terminal DIM, output terminals G1 and G2 and a current sensing terminal IS. The controller U1 receives the dimming signal Vdim from the dimming terminal DIM and outputs the first PWM signal Vpwm1 and the second PWM signal Vpwm2 from the output terminals G1 and G2.

The short protection circuit is coupled to the second terminals of the first lightbars LB11-LB1*m* and the second lightbars LB21-LB2*m* and outputs a short signal Vshort. The short signal Vshort is valid when a voltage at the second terminal of one of the first lightbars LB11-LB1*m* and the second lightbars LB21-LB2*m* is larger than a threshold voltage; that is, the short signal Vshort is valid when a short circuit occurs in the first lightbars LB11-LB1*m* and the second lightbars LB21-LB2*m*. The short signal Vshort is invalid when voltages at the second terminals of the first lightbars LB11-LB1*m* and the second lightbars LB21-LB2*m* are smaller than the threshold voltage; that is, the short signal Vshort is invalid when no short circuit occurs in the first lightbars LB11-LB1*m* and the second lightbars LB21-LB2*m*.

The third switch unit SW3 has a first terminal coupled to receive the first PWM signal Vpwm1, a second terminal coupled to the control terminal of the first switch unit SW1 and a control terminal coupled to receive the short signal Vshort. The third switch unit SW3 is open when the short signal Vshort is valid, and the third switch unit SW3 is closed when the short signal Vshort is invalid. The first switch unit SW1 is open or closed according to the first PWM signal Vpwm1 when the third switch unit SW3 is closed, and the first switch unit SW1 is closed when the third switch unit SW3 is open. The fourth switch unit SW4 has a first terminal coupled to receive the second PWM signal Vpwm2, a second terminal coupled to the control terminal of the second switch unit SW2 and a control terminal coupled to receive the short signal Vshort. The fourth switch unit SW4 is open when the short signal Vshort is valid, and the fourth switch unit SW4 is closed when the short signal Vshort is invalid. The second switch unit SW2 is open or closed according to the second PWM signal Vpwm2 when the fourth switch unit SW4 is closed, and the second switch unit SW2 is closed when the fourth switch unit SW4 is open.

In other words, when a voltage at the second terminal of one of the first lightbars LB11-LB1*m* and the second lightbars LB21-LB2*m* is larger than the threshold voltage, a short circuit occurs in the first lightbars LB11-LB1*m* and the second lightbars LB21-LB2*m*, so that the short protection circuit outputs the short signal Vshort which is valid. The valid short signal Vshort controls the third switch unit SW3 and the fourth switch unit SW4 to be open, so that the first switch unit SW1 and the second switch unit SW2 are closed. Now the control terminals of the first transistors Q11-Q1*m*, the second transistor Q2, the third transistors Q31-Q3*m* and the fourth transistor Q4 (i.e. the base terminals of the NPN BJTs) are coupled to the ground and turned off accordingly, so that the control circuit 33 disables the first current mirror 31 and the second current mirror 32 to provide a short protection for the LED driving circuit 3.

When voltages at the second terminals of the first lightbars LB11-LB1*m* and the second lightbars LB21-LB2*m* are smaller than the threshold voltage, no short circuit occurs in the first lightbars LB11-LB1*m* and the second lightbars LB21-LB2*m*, so that the short protection circuit outputs the short signal Vshort which is invalid. The invalid short signal Vshort controls the third switch unit SW3 and the fourth switch unit SW4 to be closed, so that the first switch unit SW1 is open or closed according to the first PWM signal Vpwm1, and the second switch unit SW2 is open or closed according to the second PWM signal Vpwm2 to achieve time division control of the first lightbars LB11-LB1*m* and the second lightbars LB21-LB2*m* of the LED driving circuit 3.

Figure 5:
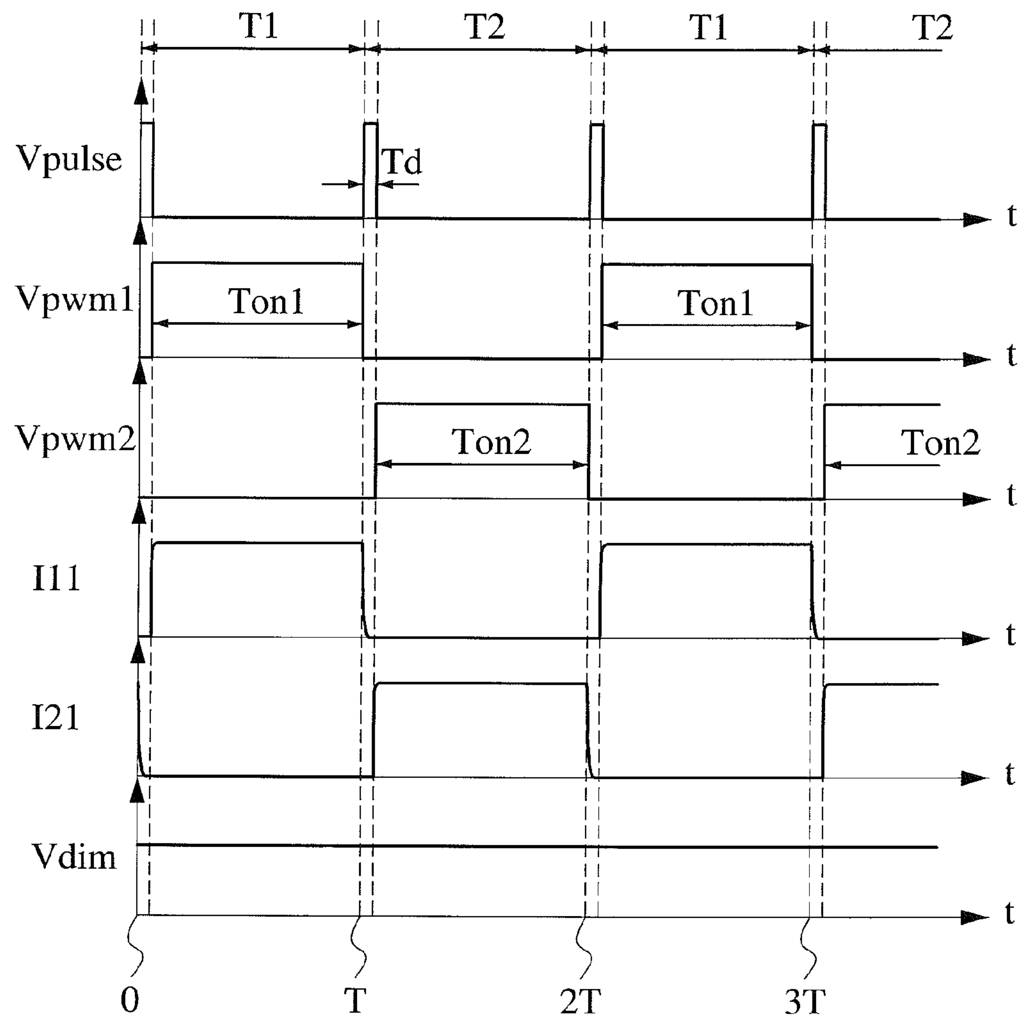
FIG. 5 is a timing diagram illustrating time division control of the LED driving circuit shown in FIG. 4 under maximum brightness when no short circuit occurs in the first lightbars and the second lightbars.

FIG. 5 is a timing diagram illustrating time division control of the LED driving circuit shown in FIG. 4 under maximum brightness when no short circuit occurs in the first lightbars and the second lightbars. Referring to FIG. 5, a pulse signal Vpulse generated by an internal oscillator (not shown) of the controller U1 is served as an operating frequency of the controller U1. Time can be divided into a plurality of periods each having a duration of T. Each period includes a pulse having a duration (or pulse width) of Td, where Td is much less than T. These pulses are adapted to avoiding overlap between the first PWM signal Vpwm1 and the second PWM signal Vpwm2 so that the first lightbars LB11-LB1*m* are turned on when the second lightbars LB21-LB2*m* are turned off, and the first lightbars LB11-LB1*m* are turned off when the second lightbars LB21-LB2*m* are turned on. It is defined that odd periods are first periods T1, and even periods are second periods T2; hence, the first period T1 and the second period T2 are repeated alternatively.

During the first period T1, the second PWM signal Vpwm2 remains at low level and controls the second switch unit SW2 to be closed to disable the second current mirror 32, then the disabled second current mirror 32 controls the second lightbars LB21-LB2*m* to be turned off and causes the currents I21-I2*m* of the second lightbars LB21-LB2*m* to become zero (here, taking the current I21 as an example shown in FIG. 5). The first PWM signal Vpwm1 is at high level except in the interval from $j\times2T$ to $(j\times2T+Td)$, where j is a non-negative integer. The first PWM signal Vpwm1 which is at high level of a duration of Ton1 controls the first switch unit SW1 to be open to enable the first current mirror 31, then the enabled first current mirror 31 controls the first lightbars LB11-LB1*m* to be turned on and balances the currents I11-I1*m* of the first lightbars LB11-LB1*m* (here, taking the current I11 as an example shown in FIG. 5). The first PWM signal Vpwm1 which is at low level of a duration of Td controls the first switch unit SW1 to be closed to disable the first current mirror 31, then the disabled first current mirror 31 controls the first lightbars LB11-LB1*m* to be turned off and causes the currents I11-I1*m* of the first lightbars LB11-LB1*m* to become zero. The duty cycle of the first PWM signal Vpwm1, Ton1/2T, will be adjusted by the controller U1 according to the dimming signal Vdim; that is, the duration of enabling the first current mirror 31 (or the duration of the first PWM signal Vpwm1 which is at high level), Ton1, will be adjusted.

During the second period T2, the first PWM signal Vpwm1 remains at low level and controls the first switch unit SW1 to be closed to disable the first current mirror 31, then the disabled first current mirror 31 controls the first lightbars LB11-LB1*m* to be turned off and causes the currents I11-I1*m* of the first lightbars LB11-LB1*m* to become zero. The second PWM signal Vpwm2 is at high level except in the interval from (2j+1)×T to ((2j+1)×T+Td). The second PWM signal Vpwm2 which is at high level of a duration of Ton2 controls the second switch unit SW2 to be open to enable the second current mirror 32, then the enabled second current mirror 32 controls the second lightbars LB21-LB2*m* to be turned on and balances the currents I21-I2*m* of the second lightbars LB21-LB2*m*. The second PWM signal Vpwm2 which is at low level of a duration of Td controls the second switch unit SW2 to be closed to disable the second current mirror 32, then the disabled second current mirror 32 controls the second lightbars LB21-LB2*m* to be turned off and causes the currents I21-I2*m* of the second lightbars LB21-LB2*m* to become zero. The duty cycle of the second PWM signal Vpwm2, Ton2/2T, will be adjusted by the controller U1 according to the dimming signal Vdim; that is, the duration of enabling the second current mirror 32 (or the duration of the second PWM signal Vpwm2 which is at high level), Ton2, will be adjusted.

In this embodiment, the dimming signal Vdim is a DC signal whose magnitude influences the duty cycles of the first PWM signal Vpwm1 and the second PWM signal Vpwm2. In alternative embodiment, the dimming signal Vdim is a PWM signal whose duty cycle influences the duty cycles of the first PWM signal Vpwm1 and the second PWM signal Vpwm2.

In summary, the LED driving circuit of the present invention divides all lightbars into the first lightbars and the second lightbars for time division control, and only the first lightbars or the second lightbars are driven in each period. For example, only the first lightbars are driven in the first period, and only the second lightbars are driven in the second period. It reduces the amount of current provided by the DC/DC converter for driving the lightbars in each period; hence, the DC/DC converter can reduce voltage ripple therein and employ a filter capacitor of smaller capacitance at its output to reduce its cost. In addition, the LED driving circuit of the present invention employs a simple driving structure with reduced components and without using a specific-purpose LED controller IC to reduce its cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. A light-emitting diode (LED) driving circuit for driving a plurality of first lightbars and a plurality of second lightbars, each of the first lightbars and the second lightbars comprising a plurality of LEDs coupled in series, each of the first lightbars and the second lightbars having a first terminal coupled to receive a direct-current (DC) voltage and a second terminal, the LED driving circuit comprising:

a first current minor coupled to the second terminals of the first lightbars for balancing currents of the first lightbars when the first current mirror is enabled, and causing the currents of the first lightbars to become zero when the first current mirror is disabled;

a second current minor coupled to the second terminals of the second lightbars for balancing currents of the second lightbars when the second current mirror is enabled, and causing the currents of the second lightbars to become zero when the second current mirror is disabled; and a control circuit coupled to the first current mirror and the second current mirror for, during a first period, disabling the second current minor and adjusting the duration of enabling the first current mirror according to a dimming signal; and, during a second period, disabling the first current mirror and adjusting the duration of enabling the second current mirror according to the dimming signal, the first period and the second period being repeated alternatively;

wherein the first current mirror comprises a first constant current source, a plurality of first transistors and a second transistor, the first constant current source providing a first constant current, each of the first transistors and the second transistor having a first terminal, a second terminal and a control terminal, the first terminal of each first transistor being coupled to the second terminal of a corresponding first lightbar, the second terminals of the first transistors and the second transistor being coupled to one another and to a ground, the control terminals of the first transistors and the second transistor being coupled to one another and to the first terminal of the second transistor, the first constant current source and the control circuit, the first transistors and the second transistor being matched to one another;

wherein the second current mirror comprises a second constant current source, a plurality of third transistors and a fourth transistor, the second constant current source providing a second constant current having the same magnitude as the first constant current, each of the third transistors and the fourth transistor having a first terminal, a second terminal and a control terminal, the first terminal of each third transistor being coupled to the second terminal of a corresponding second lightbar, the second terminals of the third transistors and the fourth transistor being coupled to one another and to the ground, the control terminals of the third transistors and the fourth transistor being coupled to one another and to the first terminal of the fourth transistor, the second constant current source and the control circuit, the third transistors and the fourth transistor being matched to one another;

wherein the control circuit comprises:

a controller for outputting a first pulse-width modulation (PWM) signal and a second PWM signal, duty cycles of the first PWM signal and the second PWM signal being determined by the dimming signal;

a first switch unit having a first terminal coupled to the control terminal of the second transistor, a second terminal coupled to the ground and a control terminal;

a second switch unit having a first terminal coupled to the control terminal of the fourth transistor, a second terminal coupled to the ground and a control terminal;

a short protection circuit coupled to the second terminals of the first lightbars and the second lightbars for outputting a short signal, the short signal being valid when a voltage at the second terminal of one of the first lightbars and the second lightbars is larger than a threshold voltage, the short signal being invalid when voltages at the second terminals of the first lightbars and the second lightbars are smaller than the threshold voltage;

a third switch unit having a first terminal coupled to receive the first PWM signal, a second terminal coupled to the control terminal of the first switch unit and a control terminal coupled to receive the short signal, the third switch unit being open when the short signal is valid and closed when the short signal is invalid, the first switch unit being open or closed according to the first PWM signal when the third switch unit is closed, the first switch unit being closed when the third switch unit is open; and a fourth switch unit having a first terminal coupled to receive the second PWM signal, a second terminal coupled to the control terminal of the second switch unit and a control terminal coupled to receive the short signal, the fourth switch unit being open when the short signal is valid and closed when the short signal is invalid, the second switch unit being open or closed according to the second PWM signal when the fourth switch unit is closed, the second switch unit being closed when the fourth switch unit is open.

2. The LED driving circuit according to claim 1, wherein the first transistors, the second transistor, the third transistors and the fourth transistor comprise NPN bipolar junction transistors (BJTs).

3. The LED driving circuit according to claim 1, wherein the first transistors, the second transistor, the third transistors and the fourth transistor comprise N-channel field-effect transistors (FETs).

4. The LED driving circuit according to claim 1, wherein the controller is a general-purpose PWM controller integrated circuit.

* * * * *